POWER OPERATED HATCH COVER
Original Filed Feb. 9, 1946 2 Sheets-Sheet 1
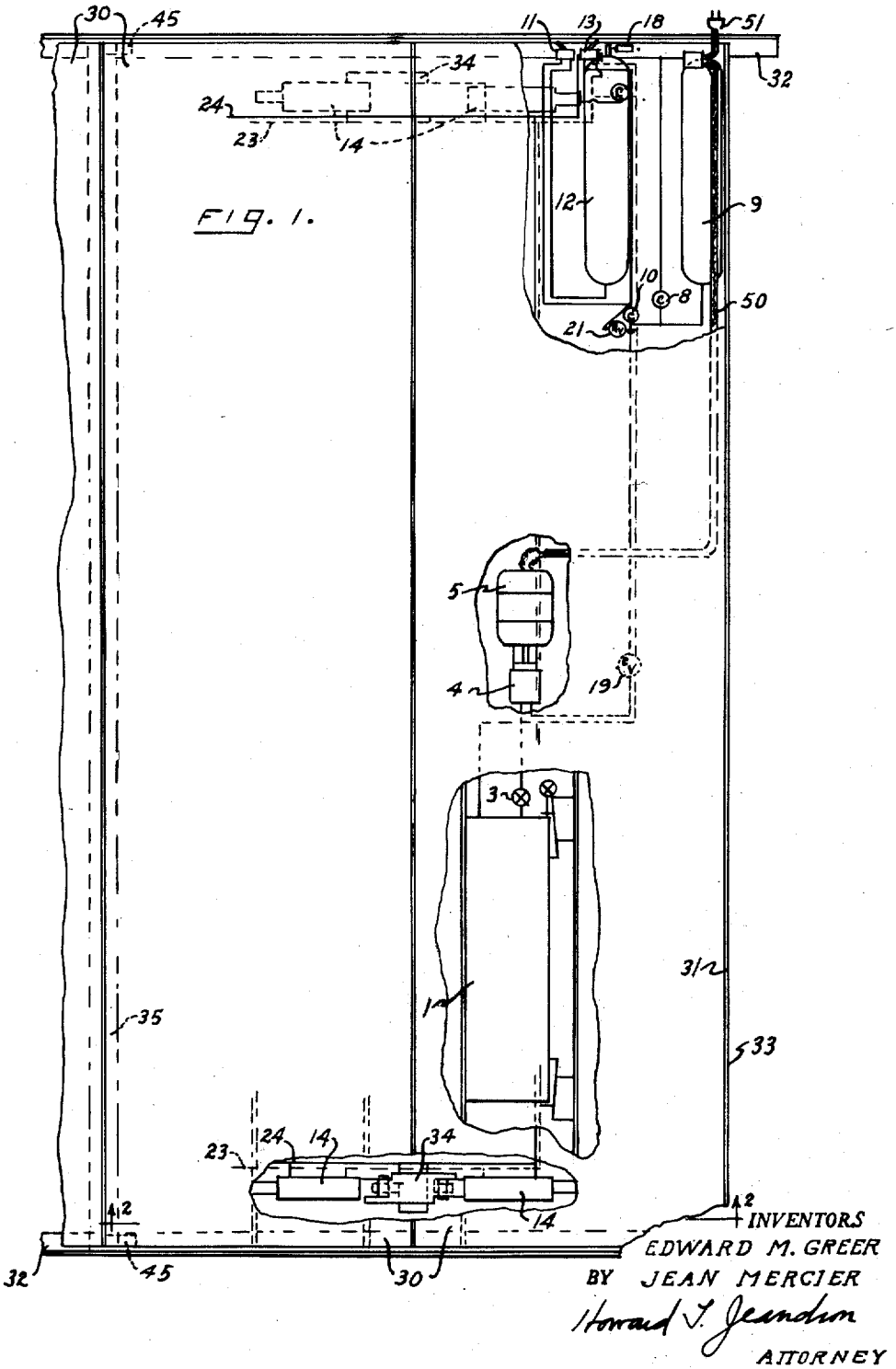

POWER OPERATED HATCH COVER

Original Filed Feb. 9, 1946 2 Sheets-Sheet 2

INVENTORS
EDWARD M GREER
BY JEAN MERCIER
Howard T. Jeandron
ATTORNEY.

United States Patent Office

Re. 24,238
Reissued Nov. 13, 1956

24,238

POWER OPERATED HATCH COVER

Edward M. Greer, Great Neck, and Jean Mercier, New York, N. Y., assignors, by direct and mesne assignments, to G. M. E. Corporation, Brooklyn, N. Y., a corporation of New York Original No. 2,491,261, dated December 13, 1949, Serial No. 646,696, February 9, 1946. Application for reissue January 30, 1956, Serial No. 562,374

15 Claims. (Cl. 160—188)

Figure 3:
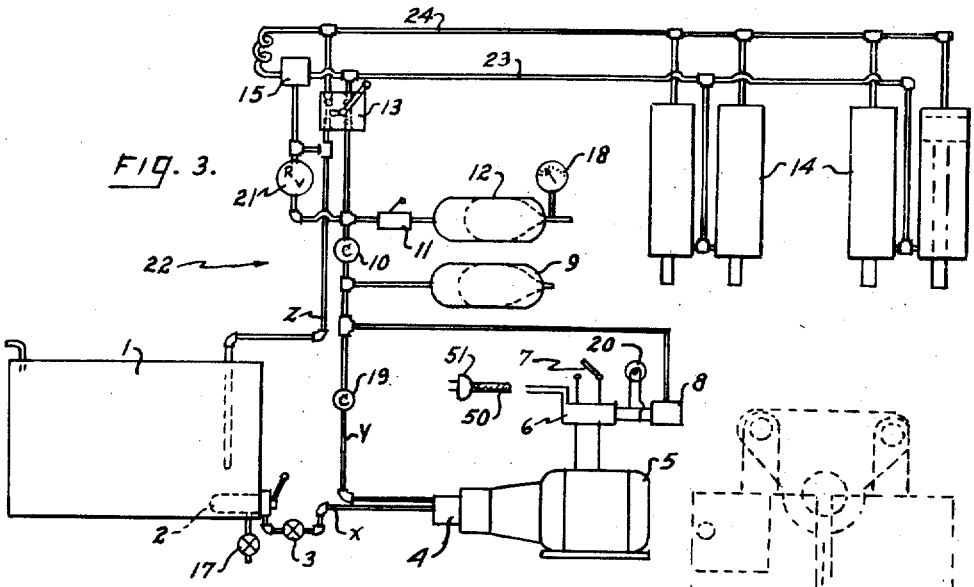

Matter enclosed in heavy brackets [ ] appears in the original patent but forms no part of this reissue specification; matter printed in italics indicates the additions made by reissue.

[This invention relates to power operated doors of all kinds and more particularly to doors having a motivating device and controls mounted within the doors to move with the doors.]

With marine hatch [door] covers, since the hatchway lies in a horizontal plane and the *hatch cover* doors *or panels* are necessarily very heavy, there is a great deal of trouble in lifting these doors out of the hatchway opening [.] . [usually] *Usually* the hatch doors are lifted with a derrick or hoist and stacked somewhere out of the way. [When the doors are placed over the hatch opening, it is necessary to support them at opposite ends of each door with a cross beam.]

*It is among the objects of the invention to provide a hatch cover assembly which with but a simple control operation may readily and rapidly be moved between closed and open position without the need of a derrick or hoist or other ship's gear.*

[An object] *A feature* of this invention is to provide [one or more doors] *a hatch cover with* [in which] a [retracting] *motivating* device *mounted within one or more of the doors or panels forming the cover* [is integral with the door or doors].

A further [object] *feature* of this invention is to provide pairs of doors that contain a retracting device in which all components are [integral] *integrated* with the doors, except the power connection necessary to supply the force to a motivating device.

A still further [object] *feature* of this invention is to provide a plurality of doors that are moved to open or closed position by hydraulic motors, which are supplied with fluid under pressure from a hydraulic pump that is in turn driven by an electric motor and in which all components are mounted within the doors.

Another [object] *feature* of this invention is to provide a pair of pivotally joined doors *or panels* in which one end of the pair of doors is hinged to an opening and the opposite end of the pair of doors is supported on rollers mounted on horizontal supporting beams and in which two opposed hydraulic cylinders are mounted, one in each door, their pistons being connected to *a* [the] pivotal *or reaction* member between the doors to provide a closure of the doors when the pistons are at one end of their stroke and a full opening of the doors when the pistons are at the opposite end of their stroke.

A further [object] *feature* of this invention is to provide one or more pairs of retractable doors that are pivotally mounted on one side of a horizontal opening and supported by rollers on the opposite extremities of each pair of doors and in which the motivating mechanism is self contained within the doors.

[A still further object of this invention is to provide one or more pair of retractable doors that are interconnected and further may be extended to an aligned position or retracted to a side by side parallel relationship.]

[A further object of this invention is to provide one or more self closing doors in which the actuating system is mounted integral with the doors, and in which the actuating system is connected to a hinge element intermediate of each pair of doors.]

A still further [object] *feature* of this invention is to provide a power actuating device mounted in one or more pair of hatch door covers with a single control to retract said doors to a side by side parallel relationship and to extend said doors to an aligned horizontal position covering said hatch.

A still further [object] *feature* of this invention is to provide a power storage device mounted in one of a pair of hatch door covers to provide the motivating force to retract said doors to an open position and to extend said doors to a closed position.

Figure 4:
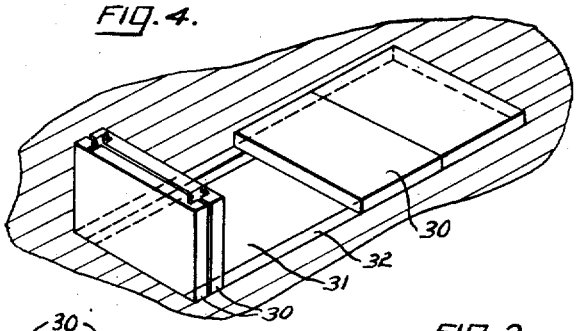
Figure 2:
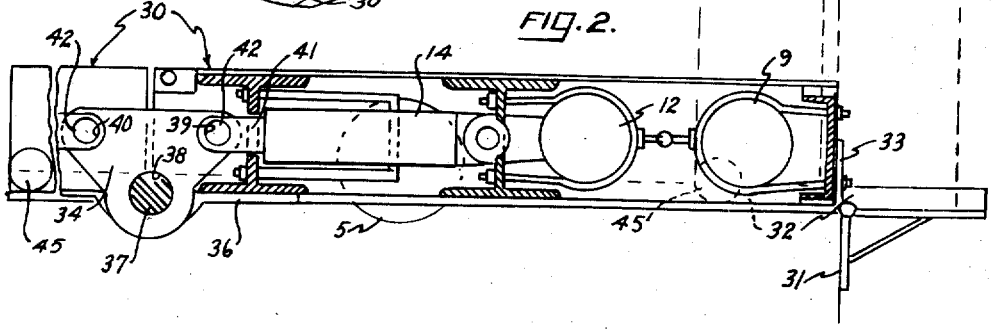

Other objects may be apparent by referring to the accompanying detailed description and the drawings in which:

Fig. 1 is a plan view of a portion of a hatch cover incorporating the features of this invention, Fig. 2 is a cross sectional view taken on line 2—2 of Fig. 1, Fig. 3 is a diagrammatic illustration of the power system mounted within the doors, and Fig. 4 is a perspective view of a typical hatch door cover.

Referring to the figures there are illustrated a plurality of [doors] *hatch cover doors or panels* 30 in Figs. 1 and 2, horizontally mounted over a hatch opening 31. The hatch [doors] *cover panels* 30 have a power motivating device 22 mounted therein. The power motivating device 22 is illustrated in Fig. 3 which is comprised of a fluid reservoir 1 [in] which *has* a filter 2 [is built] therein. A supply line X is connected to the outlet of the filter 2 and is provided with a shut-off valve 3. The supply line X is, in turn, connected to a fluid pump 4. The pump 4 is driven by an electric motor 5 and said motor 5 is controlled by a motor starter 6 which is, in turn, controlled by a switch 7. The starter 6 is also opened or closed by a pressure switch 8. The pressure switch 8 is connected by means of a fluid line to a pressure output line Y of the pump 4. The pressure output line of the pump 4 is provided with a check valve 19 to permit fluid flow in one direction. An accumulator 9 of any standard design is provided such as that illustrated, *the accumulator having* [to store fluid under pressure, in which] a shell [is provided] with a deformable gas chamber to allow storage of fluid in said shell at a predetermined pressure. This accumulator 9 is connected to the pressure output line Y of the pump 4. Another check valve 10 is provided in the pressure line Y and that is, in turn, connected to a selector valve 13. An auxiliary accumulator 12 of similar design to accumulator 9 is connected through a manual check valve 11 to the same pressure line Y connected to the selector valve 13. A relief valve 21 is connected to the same pressure line Y to limit the pressure that may be stored in accumulator 12 or supplied to the selector valve 13. A gauge 18 is provided to insure the storage of an operating fluid pressure. The selector valve 13 is also connected by means of a return line Z to the fluid reservoir.

The selector valve 13 is of a standard design having four ports as indicated in Fig. 3. Poppet valves control the flow of fluid through each port and the poppets are controlled to be opened or closed by the manually operated means [13A] illustrated. Thus, the manual control [13A] may be placed in either of two positions. When in the position [1] indicated, the aligned ports will be opened to each other [.]. *Thus* [thus] the fluid from the line Y will pass directly through the valve to a line 23, while the fluid in a line 24 will be connected directly through the valve 13 to the line Z. Likewise, when the manual member is moved to its opposite position [2,] the diagonally positioned ports will be connected. Thus, the fluid from line Y would flow through to line 24 and the return fluid in line 23 would flow through to the return line Z. A plurality of hydraulic actuating cylinders 14 are connected to the lines 23 and 24, the line 24 being connected to one end of all cylinders, while the line 23 is connected to the opposed end of all cylinders. A thermal relief valve 15 is connected to the lines 23 and 24 so that when an excessive pressure is produced in either line the fluid will be relieved through a return to the line Z. The thermal relief valve is similar in construction to an ordinary relief valve, such as that illustrated at 21. The pressure switch 8 is provided to break the circuit through the starter 6 to the motor 5, thus an indicating light 20 may be provided which will be on as long as the motor is operating, and will be off whenever the pressure is excessive or whenever the switch 7 is opened. The reservoir 1 is also provided with a drain valve 17.

Referring to Figs. 1 and 2 there is illustrated a hatch opening 31 having a cross beam 32 at either side thereof. A plurality of hatch *cover panels or* doors 30 are positioned in alignment over the hatch opening 31. The doors 30 run the length of the opening 31 and bear on the cross members 32. The plurality of doors are hinged to one side of the opening 31 by a hinge member 33 affixed to the jamb of the opening 31. The doors 30 are provided with an intermediate pivotal or articulating member 34 at either end of each pair of doors positioned between each succeeding pair of doors 30. A hinge 35 is provided between each succeeding pair of doors. The articulating or pivotal member 34 is mounted by means of a plate 36 to the lower side of the doors 30 and has a pivotal pin 37 therethrough. The plate 34 is triangular in shape being provided with three apertures 38, 39 and 40. The pin 37 passes through aperture 38 and a pair of opposed cylinders 14 are mounted in opposed relationship within the doors 30. They may be supported by structural members of the door in any fashion, such as illustrated in Fig. 2 so that the piston is free to move and the cylinder is *mounted* [held] in [a fixed] position within the door 30. In the aligned position, as indicated in Fig. 2, the cylinder 14 must have its piston in a retracted position and thus the piston rod 41 is connected by means of a pin 42 to the aperture 39, while the opposed piston rod 41 would be connected by means of a pin 42 to the aperture 40. Thus, when a motivating force is supplied to both pistons 41 the movement of the piston rods 41 away from the cylinder 14 will result in a force in which the components are necessarily upward, this is due to the fact that their connecting pins are above the center line thrust, thus the pivotal member 34 will be moved upward and since the door 30 is hinged or pivoted at 33 the first door will be moved upward in a pivotal movement until the pistons 41 have completed their extended stroke and the door 30 has reached the position indicated in dotted lines and at the same time the adjoining door 30 will have reached a parallel position indicated in dotted lines. It will be noted that the adjoining door is provided with a roller 45 which bears on the cross beam 32, thus during the retracting action the roller moves from its position indicated in Fig. 2 to the dotted position indicated. It is apparent, referring to Fig. 1, that a second pair of doors 30 hinged to the first pair by the hinge 35 with the same articulating mechanism mounted therein would perform in similar fashion to fold in the same parallel relationship indicated in dotted lines in Fig. 2.

[Referring to Fig. 1 the reservoir 1 is mounted integral with the door 30. Likewise, the motor 5 and pump 4 are supported on or mounted into the door 30 and the accumulators 9 and 12 are strapped within the door 30 by structural bands or other supporting means and the component parts illustrated in Fig. 1 are connected to perform, as shown in Fig. 3.]

In operation the reservoir 1 is provided with the hydraulic fluid to be used and the motor 5 and its starter 6 are connected by means of an extension line 50 to a plug 51 which may be connected to an external source of power. The accumulators 9 and 12 are filled at the air valve end with a gas at a predetermined pressure. The mechanism is now ready to function. For operation the switch 7 is closed causing the motor 5 to be operated and the pump 4 to be ready to pump fluid to the system. The shut-off valve 3 is opened, thus the fluid from the reservoir 1 passing through the filter 2 will be supplied to the pump 4 and the pump 4 will supply fluid under pressure through the check valve 19 to the accumulator 9 storing fluid pressure within the accumulator 9 and, likewise, the fluid pressure passing through the check valve 10 will be stored in the accumulator 12 passing through the manual check valve 11. The fluid pressure in the supply line Y will pass to the selector valve 13 where it is controlled by the manual means illustrated [,]. *Thus,* [thus] in one position the fluid pressure passes through the line 24 to the same end of all hydraulic cylinders 14 connected to the line 24 [, thus,]. *The* cylinders 14 will have their piston rods 41 extended which, as already explained, will cause the doors 30 to be folded into a retracted position. During this stroke of the piston 14 the fluid in the opposite side of the piston 14 will be expelled through the line 23 to which all pistons 14 are connected and, thus, the return fluid will pass through the selector valve 13 to the return line Z which, during the operation of the pump 4, will cause the fluid to be circulated back into the supply line Y. It is apparent that the doors 30 may be extended from their open position, indicated in dotted lines in Fig. 2, to a closed aligned position by reversing the selector valve 13, thus the fluid under pressure from line Y will be redirected to the line 23 and thus to the opposite end of the cylinders 14 causing the piston rods 41 to be retracted, thus causing the doors to move outward on the rollers 45 until they reach an aligned position, as indicated in Fig. 2. It is, likewise, true that during this stroke of the piston 41 the fluid on the opposite side of the piston in each cylinder 14 will pass through the line 24 back through the selector valve 13 to the return line Z in the same fashion as already described. Any excessive heat developed in the operation of this device which causes a rise in fluid pressure in line 23 or 24 will be relieved through the thermal relief valve 15. This maximum pressure is necessarily above the operating pressure used in cylinders 14.

It is apparent that any defect in the system, such as the reservoir 31 being drained by the fluid supply demanded or the failure of the motor 5 to operate would leave the doors 30 in an inoperative position. Therefore, the storage of an operating pressure in the accumulator 12 permits the full retraction and full extension of the doors 30 by operating the manual check valve 11 so that the pressure stored therein may be supplied through the selector valve 13 in the fashion already described.

Various groupings or pairs of doors may be used to provide the necessary cover according to the size of the hatchway to be covered. For instance, a small hatchway may be covered with a *pair of doors or panels* [single door] having [a] *an associated* pivotal plate. [associated with it, or as described a pair of doors may be used.] A larger hatchway may be covered with two pair of doors, all operating from the one side, and a still larger hatchway may be covered by three pair of doors, in which two pair operate from one side, while a single pair operates from the opposite side, and so it is possible to group the pairs to be retractable and extendable over most any size hatchway.

Another feature of this invention is the fact that a single door may have the complete power system mounted therein. In such case there will be a single motivating means and a pivotal actuating plate associated with the door. Also one or more doors are removable as an operative unit, except for the hinge pins to mount them to the hatchway. When removing a single door the pivotal pins to connect it to the articulating members between each door are removed, and the plug that is normally connected to a power line is disconnected, the door or doors may then be quickly removed for repair or maintenance of the component parts mounted therein. A complete unit having the same component parts may be quickly installed with the same pivotal pins for continued operation of the hatchway cover.

A further feature of this device is the positioning of the main hinge for the group of doors. The hinge may be mounted a sufficient space back of the supporting framework to permit the doors to be retracted to a nested relationship clear of the opening.

Various modifications of the articulating members may be used without departing from the spirit of this invention. Various forms of power devices may be incorporated within the doors to operate with the articulating members that are mounted between the pairs of doors without departing from the spirit of this invention, thus various changes and modifications may be employed to accomplish a similar result without departing from the spirit of this invention, and this invention shall be limited only by the prior art and the appended claims.

What is claimed is:

[1. In a door articulating system, a door, an articulating element mounted to one side of said door, a motivating means integrated with said door, said motivating means being connected to said articulating element, said door being pivotally mounted in an opening, an external connection to supply power to said motivating means, said motivating means including means to swing said door to either of two extremes, open or closed.]

[2. In a door articulating system, a door, an articulating element mounted to one side of said door, a motivating means integrated with said door, said motivating means being connected to said articulating element, said door being pivotally mounted in an opening, a power storage means for said motivating means, mounted integral with said door, said motivating means including means to swing said door to either of two extremes, open or closed.]

3. In a door articulating system, the combination including a pair of doors, an articulating element mounted between the doors, a fluid motor mounted in each door in opposed relationship, power means integrated with said doors to supply the fluid motors with a motivating force, said fluid motors being connected to the articulating element, an external power connection to supply said power means, said motivating means including means to swing said doors to either of two extremes, open or closed.

4. A retractable cover for an opening which comprises a plurality of pairs of doors retractable and extendable from a common hinge attached to one side of said opening, a support on each end of said opening, articulating elements mounted between the doors of each pair, hinges mounted between each pair of doors, a pair of rollers for each pair of doors mounted one on each end of the door at the corner farthest from the hinge about which that pair is pivoted and bearing on said supports to roll in alignment with the configuration of said opening, a fluid motor mounted in each door and positioned in opposed relationship in each pair of doors and connected to the said articulating element mounted between the associated pair of doors, power means integrated with said doors to supply the fluid motors with a motivating force, an external connecting element to supply said power means, switching means to control the motivating force to the fluid motors to operate the door covers in one direction to open, and means to reverse said switch means to operate said door covers in a reversed direction to close same.

5. In a folding door of the type having a pair of panels with one edge portion of one panel hinged at the doorway and the opposite edge portion of the other panel guided in a single plane, articulating elements secured to the other edge portion of the panels, a motor integrated with each panel and connected to an associated articulating element and said motors mounted to operate in opposed relationship, a two way switch and a power source to control and operate said motors to selectively cause the panels to extend into an extreme position in alignment in the single plane.

6. In a folding door of the type having a pair of panels with one edge portion of one panel hinged at the doorway and the opposite edge portion of the other panel guided in a single plane, articulating elements secured to the intermediate edge portion of the panels, a pair of fluid motors integral with each panel and connected to an associated articulating element and said motors mounted in each panel to operate in opposed relationship, a power unit and a two-way switch therein integrated with said panels to control and operate said fluid motors to selectively cause the panels to extend into an extreme position in alignment in the single plane.

7. In a folding door of the type having a pair of panels with one edge portion of one panel hinged at the opening and the opposite edge portion of the other panel guided in the configuration of the opening, articulating elements secured to the intermediate edge portion of the panels, a pair of motors integral with each panel and connected to an associated articulating element and said motors mounted in each panel to operate in opposed relationship, a power unit and a two-way switch and integrated with said panels to control and operate said motors to selectively cause the panels to extend into an extreme position covering the opening.

8. In a folding door of the type having a pair of panels with one edge portion of one panel hinged at the side of the opening and the opposite edge portion of the other panel guided in the plane or planes of the opening, articulating elements secured to the intermediate edge portion of the panels, a pair of motors integral with each panel and connected to an associated articulating element and mounted to operate in opposed relationship, a power source and a two-way switch therein to control and operate said motors, to selectively cause the panels to extend into the configuration of the closed position.

9. In a folding door of the type having a plurality of pairs of panels with one edge portion of the first pair of panels hinged at the side of the opening and the succeeding pair of panels hinged to the opposite edge portion of said first pair of panels and said opposite edge guided in the plane of the opening, said succeeding pairs of panels having their opposite edge portion similarly guided in the same plane of the opening, pivotal elements secured to the middle joint of each pair of panels, a pair of motors integral with each panel and connected to an associated articulating element and said motors mounted in each panel to operate in opposed relationship, a power unit and a two-way switch therein integral with said panels to control and operate said motors to selectively cause the panels to fold into a nested open position.

*10. A cover assembly for a hatchway, comprising a pair of panels each having an outer and an inner face lying in side by side relation in substantially a horizontal plane when they close the hatchway, means pivotally mounting an edge of one of said panels with respect to such hatchway, pivot means the axes of which extend along a straight line substantially parallel to the plane of the hatchway, connecting the adjacent edges of said panels for folding movement thereof between closed substantially horizontal position and open substantially vertical position, means to guide the opposite edge of the other of said panels in substantially a horizontal plane, reaction means for said pair of panels, said pivot means being substantially at the inner face of said panels and pivotally mounting said reaction means, and movable means*

*carried by said cover assembly operatively connected to said reaction means to react thereagainst in order to effect movement of said panels about said pivot means, between closed and open position, said movable means being located under the outer face of said panel to be positioned between the outer faces of said panels when they are in open position, said reaction means, each of said pivot means and said movable means all being located within the perimeter of said panels when in closed position.*

*11. The combination set forth in claim 10 in which said movable means comprises a plunger in a cylinder pivotally mounted at one end to one of said panels, said plunger being operatively connected to said reaction means and movable at right angles to the pivot mount of the latter and means hydraulically to operate said plunger.*

*12. A cover assembly for a hatchway comprising a pair of panels, each having an outer face and an inner face lying in side by side relation in substantially a horizontal plane when they close the hatchway, means pivotally mounting an edge of one of said panels with respect to such hatchway, pivot means, the axes of which extend along a straight line substantially parallel to the plane of the hatchway connecting the adjacent edges of said panels for folding movement thereof between closed substantially horizontal position and open substantially vertical position, means to guide the opposite edge of the other of said panels in substantially a horizontal plane, a plurality of reaction means for said pair of panels, pivotal mounting means on the underside of said panels for each of said reaction means, said pivot means mounting said reaction means, a plurality of hydraulic units associated respectively with said reaction means, each of said units being pivotally mounted to one of said panels, and having a movable plunger operatively connected to an associated reaction means to react thereagainst in order to effect movement of said panels about their pivotal connection between closed and open position, said hydraulic units being located under the outer face of said panels to be positioned between said outer faces when the cover assembly is in open position, said reaction means, each of said pivot means and said movable means all being located within the perimeter of said panels when in closed position.*

*13. The combination set forth in claim 12 in which said hydraulic units are substantially identical, said plungers are movable at right angles to said pivot means and in which fluid under substantially the same pressure is applied concurrently to said hydraulic units.*

*14. The combination set forth in claim 12 in which said reaction means are symmetrically located with respect to the end edges of said panels and said hydraulic units are*

*substantially identical, each plunger is aligned with a corresponding reaction means and each plunger is movable at right angles to the axis of said pivot means and in which fluid under substantially the same pressure is applied concurrently to said hydraulic units.*

*15. A cover assembly for a hatchway, comprising a pair of panels each having an outer face and an inner face lying in side by side relation in substantially a horizontal plane when they close the hatchway, means pivotally connecting the adjacent edges of said panels, pivot means, the axes of which extend along a straight line substantially parallel to the plane of the hatchway for folding movement thereof between closed substantially horizontal position and open substantially vertical position, means to guide the opposite edge of the other of said panels in substantially a horizontal plane, a reaction member for said pair of panels, said pivot means mounting said reaction member, a pair of hydraulic units positioned in opposed relation under the outer face of said panels and pivotally mounted respectively on said panels and in alignment with said reaction member, each of said units having a plunger movable toward and away from said reaction member and operatively connected thereto to react thereagainst in order to effect movement of said panels about their pivotal connection between closed and open position.*

*16. The combination set forth in claim 15 in which there is a plurality of pairs of hydraulic units in opposed relation, each with an associated reaction member, said reaction members being pivotally mounted on an axis coaxial with the axis of said pivotal connection, said reaction members being symmetrically located with respect to the end edges of said panels.*

*17. The combination set forth in claim 15 in which there is a plurality of pairs of hydraulic units in opposed relation, each with an associated reaction member, said reaction members being symmetrically located with respect to the end edges of said panels, the plungers of each pair of said hydraulic units being movable at right angles to the axis of said pivotal connection and aligned with the associated reaction member.*

References Cited in the file of this patent or the original patent

UNITED STATES PATENTS

| | | |
|---|---|---|
| 1,172,562 | Rowntree | Feb. 22, 1916 |
| 1,581,832 | Blockhan | Apr. 20, 1926 |
| 1,832,966 | Cook | Nov. 24, 1931 |
| 1,931,727 | Hebert | Oct. 24, 1933 |
| 2,322,372 | Levy | June 22, 1943 |
| 2,408,739 | Dawes | Oct. 20, 1946 |
| 2,449,482 | Hufferd | Sept. 14, 1948 |